United States Patent
Burley et al.

(10) Patent No.: US 6,701,990 B1
(45) Date of Patent: Mar. 9, 2004

(54) ROLL FORMING MACHINE

(75) Inventors: Graham J. Burley, Goldington (GB); Stephen Williams, Gwent (GB); Allan J. Kaye, Bristol (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 09/507,927

(22) Filed: Feb. 22, 2000

(65) Prior Publication Data (65)

Related U.S. Application Data

(63) Continuation of application No. PCT/GB99/03503, filed on Oct. 22, 1999.

(30) Foreign Application Priority Data

Oct. 23, 1998 (GB) .............................. 9823104
Sep. 1, 1999 (GB) .............................. 9920471

(51) Int. Cl.[7] .......................... B29C 53/04; B29C 70/50
(52) U.S. Cl. .................. 156/463; 156/465; 156/470
(58) Field of Search .................. 156/461, 463, 156/465, 467, 470, 543, 180, 464; 264/134, 136, 137, 259; 52/729.1

(56) References Cited

U.S. PATENT DOCUMENTS

| 4,151,031 A | * | 4/1979 | Goad et al. | ................. 156/201 |
| 4,198,453 A | * | 4/1980 | Olson | ........................... 428/85 |
| 4,512,835 A | * | 4/1985 | Gardiner | ..................... 156/174 |
| 4,559,005 A | * | 12/1985 | Gants et al. | ................. 425/363 |
| 4,645,549 A | * | 2/1987 | Lalor | ........................... 156/54 |
| 4,780,261 A | * | 10/1988 | Vajtay | ..................... 264/285 |
| 4,789,594 A | * | 12/1988 | Stawski | ..................... 428/397 |
| 4,847,118 A | | 7/1989 | Oshima et al. | |
| 5,076,873 A | | 12/1991 | Lowery | |
| 5,093,158 A | | 3/1992 | Li et al. | |
| 5,340,520 A | | 8/1994 | Strunk et al. | |
| 5,665,191 A | * | 9/1997 | Johansson et al. | .......... 156/161 |
| 5,783,279 A | * | 7/1998 | Edgson | ........................ 428/116 |
| 5,948,509 A | * | 9/1999 | Felson | ........................ 428/192 |
| 6,112,409 A | * | 9/2000 | Jackel | ..................... 29/897.35 |

FOREIGN PATENT DOCUMENTS

| GB | 565370 | 11/1944 |
| GB | 1169621 | 2/1967 |
| JP | 59-148630 | 8/1984 |
| JP | 1-285315 | 11/1989 |
| JP | 4018308 | 1/1992 |
| JP | 9-131788 | 5/1997 |
| WO | WO 90/06387 | 6/1990 |
| WO | WO 91/19754 | 12/1991 |

* cited by examiner

*Primary Examiner*—Michael W. Ball
*Assistant Examiner*—Todd J. Kilkenny
(74) *Attorney, Agent, or Firm*—Nixon & Vanderhye P.C.

(57) ABSTRACT

The roll forming machine comprise a series of rollers 14, 20, 28 and 36 for shaping a fabric 13 such as a fabric impregnated with a curable matrix. A feed roller 36 is provided for feeding a length of material 37 such as a tow of fibres onto the fabric during or subsequent to the shaping process. The roll forming process is particularly useful in the manufacture of blade stiffeners for an aircraft wing.

26 Claims, 4 Drawing Sheets

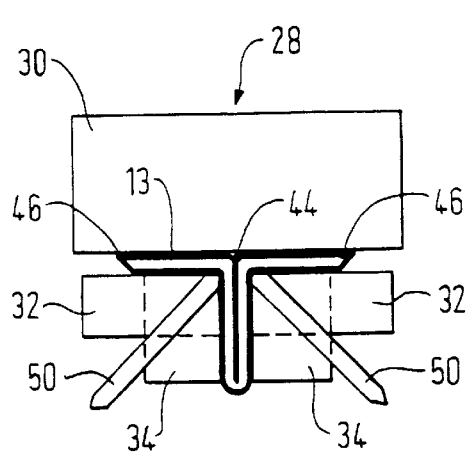
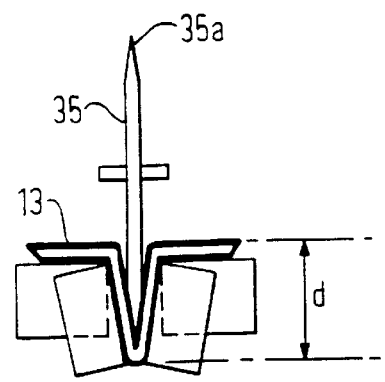
FIG. 5
FIG. 6
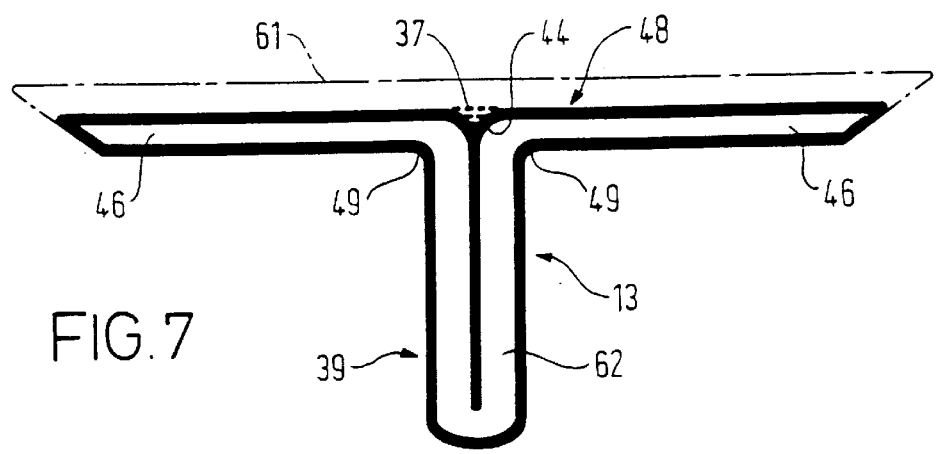
FIG. 7
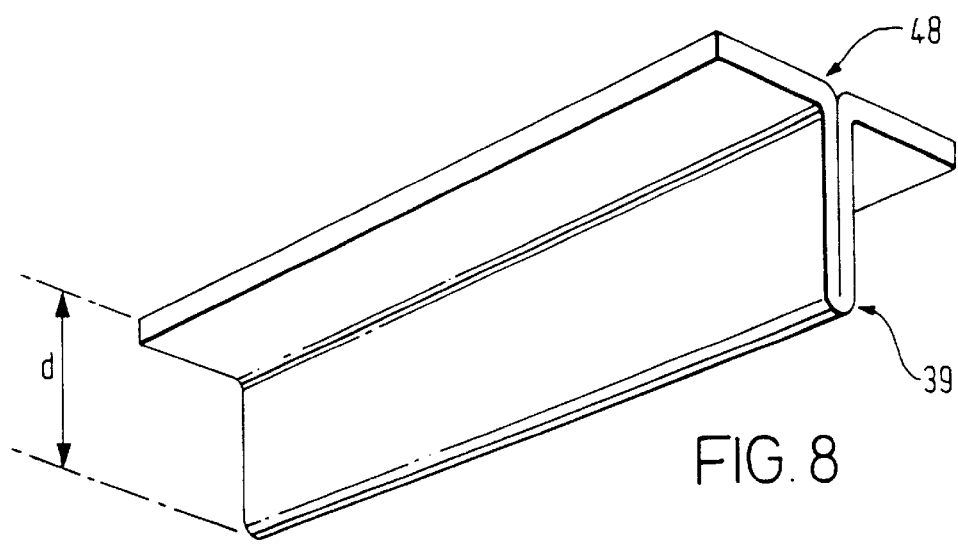
FIG. 8

ROLL FORMING MACHINE

This is a continuation of PCT application No. PCT/GB99/03503, filed Oct. 22, 1999.

BACKGROUND OF THE INVENTION

1. Field of the Invention

The invention relates to a roll forming machine and method and is particularly, but not exclusively, concerned with the production of a roll formed component for an aircraft.

2. Discussion of Prior Art

Where roll forming of components is effected on a machine, material passing through the machine is shaped by deforming and, in some cases, surfaces of the material are pressed together and webs and flanges are formed. When roll forming the material, corners are generally radiussed as it is not normally possible to form a corner with a precise sharp edge. Sometimes, where the radius is next to an adjacent radius or surface an unwanted recess is defined. Also, when manufacturing aircraft components such as wings, a lay-up of fabric such as carbon fiber is sometimes used to form the wing skin. Certain areas of the wing skin may be stiffened on the internal surfaces by means of blade stiffeners of T-shape cross section. Where a lay-up of fabric is used to produce the wings, it would be useful to manufacture blade stiffeners from similar material. The present invention is concerned with a roll forming machine and method which addresses the above points.

SUMMARY OF THE INVENTION

According to a first aspect of the invention, there is provided a roll forming machine comprising roller means for shaping a fabric such as a fabric impregnated with a curable matrix, and feed means for feeding a length of material onto the fabric during or subsequent to the shaping process.

Not only will such a machine enable a component such as a blade stiffener to be made from a fabric but it also enables material to be fed into an unwanted gap or recess in the roll formed fabric.

According to a second aspect of the invention, there is provided a roll forming machine comprising roller means for shaping a fabric such as a fabric impregnated with a curable matrix, and feed means for feeding a length of material, into or across a space created between portions of the fabric during or subsequent to the shaping process.

The feed means may cause the length of material to be laid into or across a recess formed at a juncture between adjacent portions of the shaped fabric.

In the preferred embodiment, the roller means deforms the fabric so as to position the juncture between flange and web portions of the fabric. In such a case, the roll formed of fabric may be of T-shape section, the vertical limb of the T-shape forming the said web and the horizontal limb thereof forming the flange.

Means such as a roller may be provided for controlling depth of the formed fabric, for example the depth of the web portion. If desired the means for controlling the depth of formed fabric may be controllable to vary the depth progressively to form a taper. The fabric may move through the machine at a constant rate. The means for controlling depth may be arranged to form sections of various depths in the length of the material The fabric may be in the form of a flat laminate or may be in the form of a tube such as a braid. In the latter case, the feed means is arranged to feed the length of material axially through the tube.

The length of material may comprise a tow of fibers or, instead of or in addition to the tow of fibers, a further laminate.

If desired, the fabric may be heated prior to being shaped by the roll forming machine to soften the fabric. If desired, the heating means may continue to heat the fabric as it encounters the roller means.

If desired, a lay-up station may be provided for laying up fabrics to form a laminate and means may be provided for conveying the laminate from the lay-up station to the roller means.

According to a third aspect of the invention there is provided a roll forming machine comprising a lay-up station for laying up fabrics to form a laminate, roller means for shaping the laminate and means for conveying the laminate from the lay-up station to the roller means.

According to a fourth aspect of the invention, there is provided a method of roll forming a fabric such as a fabric impregnated with a curable matrix comprising passing the fabric between roller means and feeding a length of material onto the fabric during or subsequent to the shaping process.

According to a fifth aspect, of the invention, there is provided a method of roll forming a fabric including forming the fabric immediately upstream of roller means, conveying the formed fabric to the roller means and causing the roller means to shape the fabric.

BRIEF DESCRIPTION OF THE DRAWINGS

A roll forming machine in accordance with the invention will now be described by way of example with reference to the accompanying drawings in which;

FIGS. 2 to 5 are cross sections through the machine shown in FIG. 1 on the lines II—II, III—III, IV—IV, V—V respectively in FIG. 1;

FIG. 6 shows the way in which a height adjustable roller can be provided for the machine of FIG. 1;

FIG. 7 is a cross section to a larger scale through a roll-formed laminate on line VII—VII in FIG. 1;

FIG. 8 is a perspective view showing a roll formed laminate made by the roll forming machine of FIG. 1;

DETAILED DISCUSSION OF EMBODIMENTS

Figure 1:
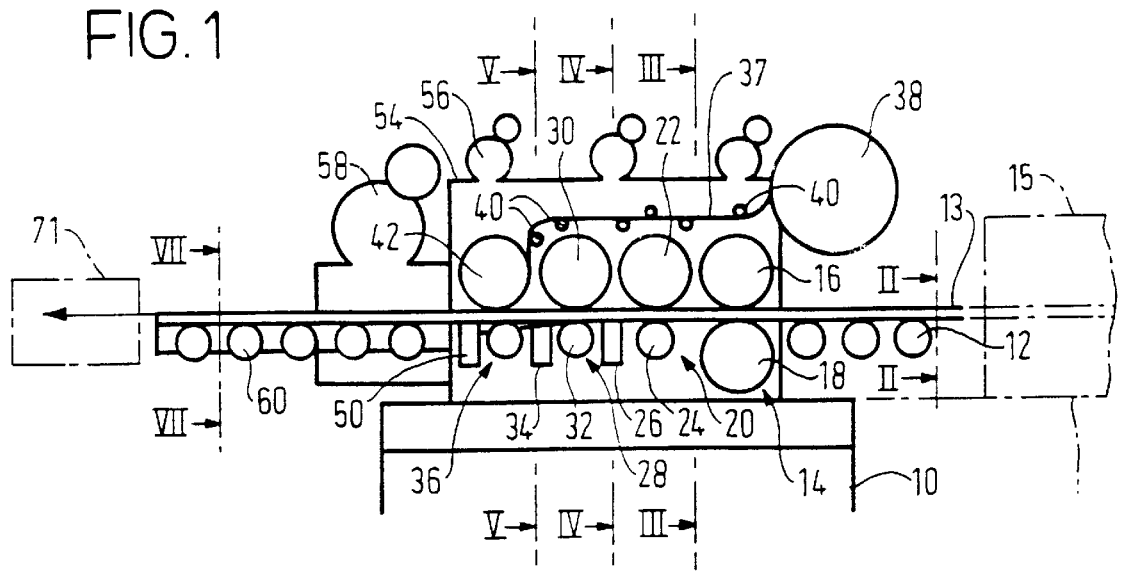
FIG. 1 is a diagrammatic side view of one embodiment of a roll forming machine in accordance with the invention.
Figure 2:
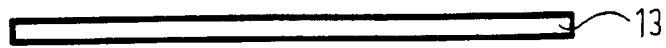

Referring to FIG. 1, the machine comprises a floor-mounted bed 10 on which a multiplicity of rollers is mounted. In FIG. 1, three upstream rollers 12 support a laminate 13 as it enters the roll forming machine. The laminate 13 is a lay-up of carbon fiber fabrics preimpregnated with an uncured epoxy matrix. In the uncured form, the laminate 13 is semi-rigid. The laminate 13 may be produced at a lay-up station 15 immediately upstream of the rollers 12. In such a case the rollers 12 may serve as a conveyor for the laminate 13 leaving the lay-up station 15.

Figure 3:
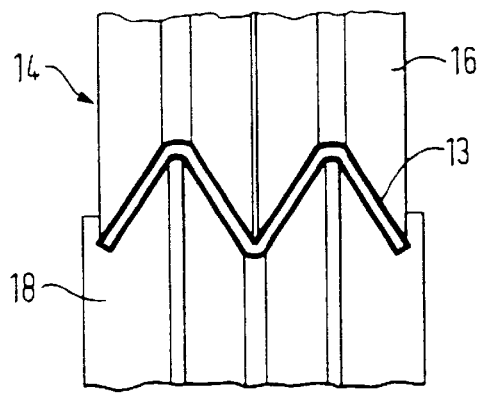

The laminate 13 passes through a first set of shaping rollers 14 comprising upper and lower rollers 16, 18. The rollers 16, 18 have W shaped peripheries which fit one within the other as shown in FIG. 3 with a nip between. The rollers 16, 18 form the laminate into an inverted W shape.

Figure 4:
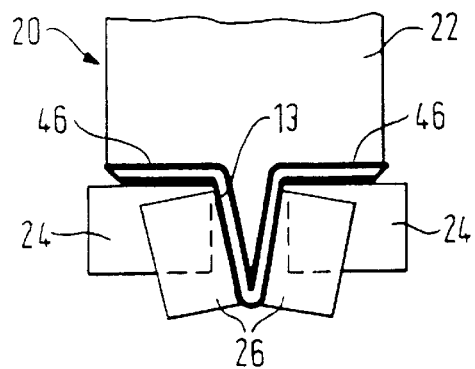

Next, the laminate passes through a second set of shaping rollers 20 comprising an upper roller 22 and two spaced apart lower rollers 24. Also, the set of rollers 20 include two inclined rollers 26 and it will be noted that the rollers 22 to 26 cause the laminate 13 to take on the form shown in FIG. 4.

Next, the laminate 13 passes through the third set of shaping rollers 28 comprising an upper roller 30, two spaced apart lower rollers 32 and two vertical rollers 34, the rollers 32 to 34 causing the laminate 13 to take on the T-shape shown in FIG. 5.

If desired a narrow wheel-like roller 35 (FIG. 6) having a tapered periphery 35a can be provided, for example, immediately upstream of rollers 28. The roller 35 maintains the required depth d of a web 39 of the formed laminate 13. As described in detail below with reference to FIGS. 8 to 12, the roller 35 can be raised and lowered to control the depth d.

Next, there is a further set of rollers 36 which enable tows of fibers to be added to the deformed laminate 13. The tows of fibers 37 are carried by a drum 38 and are conveyed between supporting rollers 40 to an upper roller 42 (constituting the aforesaid feed means) of the further set of rollers 36. The tows pass beneath the upper roller 42 and into a triangular recess 44 (see FIGS. 5 and 6) at the top of the T-shaped laminate 13 which is formed where upper sections 46 of the shaped laminate 13 are bent outwards to form a horizontal flange 48. Corner rollers 50 are added to ensure that upper corners 49 of the deformed laminate are pressed well in together. The laminate 13 in its final T-shaped configuration then passes out of the machine along transport rollers 60.

To assist shaping of the laminate 13, the laminate is preferably heated before and/or during the deforming process. Conveniently, the sets of rollers 14, 20, 28 and 36 are arranged within a housing 54 provided with hot air blowers 56. It has been found that a temperature within the range of around 60° Centigrade to 80° Centigrade can be used to soften the laminate initially. The hot air softens the laminate 13 before curing begins and, to stiffen the shaped laminate 13 and the tows 37 as it leaves the housing 40, cold air is preferably blown onto the laminate by means of a blast freezer 58. The T-shaped laminate 13 is subsequently cured by the application of heat.

Instead of, or in addition to, feeding the tows 37 to fill the recess 44, a further laminate 61 may be fed on to the horizontal flange 48 as shown in broken lines in FIG. 7. The laminate 61 can be applied to the T-shaped form of the laminate 13 immediately downstream of the set of rollers 36 and serves to form an upper composite horizontal flange of substantially the same thickness as a vertical web 62 of the T-shape as shown in FIG. 7.

The laminate 13 may be driven through the machine 10 by powering selected rollers. However, in the preferred embodiment, the laminate is initially fed through the machine and is thereafter pulled through the rollers by means of a suitable pulling device 71. In that way, there is a reduced likelihood of rucking occurring in the laminate as it moves through the machine and the mechanical properties in the shaped laminate are improved. If desired, the thickness of the laminate may vary along its length. The sets of rollers 14, 20, 28 and 36 may be arranged to apply a constant pinch force to the laminate by means of pneumatics. By providing a constant pinch force using constant air pressure, the rollers of the sets can move in and out in response to changes in thickness of the laminate.

Whilst reference has been made to the use of a carbon fiber fabric impregnated with an epoxy matrix, dry fabric layers with a heat activated binder could be used instead. The dry fabric lay-up is rolled in the machine 10 and resin is later infused by a resin transfer molding process.

Figure 9:
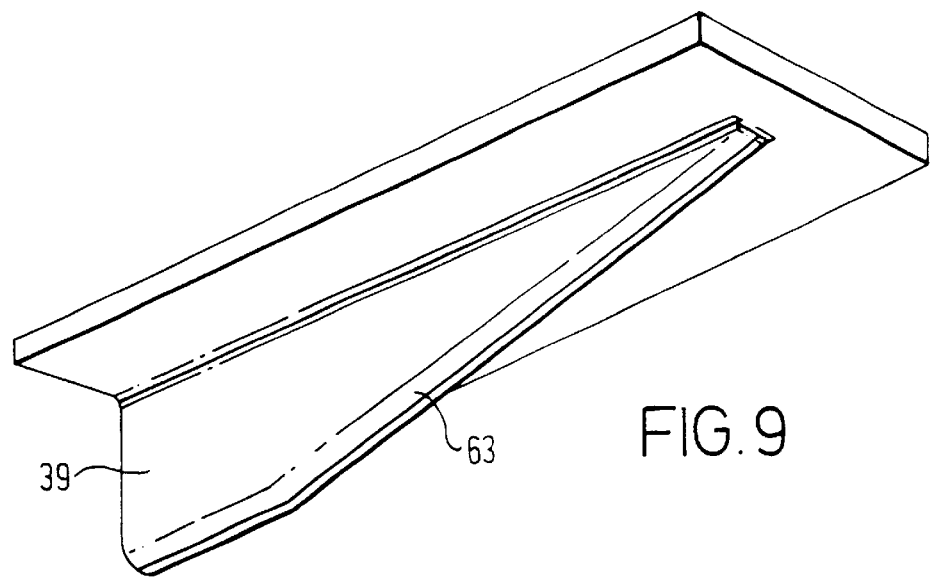
FIG. 9 is a perspective view of a roll formed laminate having a tapering web at one end.
Figure 10:
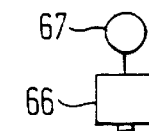
FIGS. 10 to 12 show stages of adjustment of a wheel-shaped roller for creating the taper shown in FIG. 9.
Figure 11:
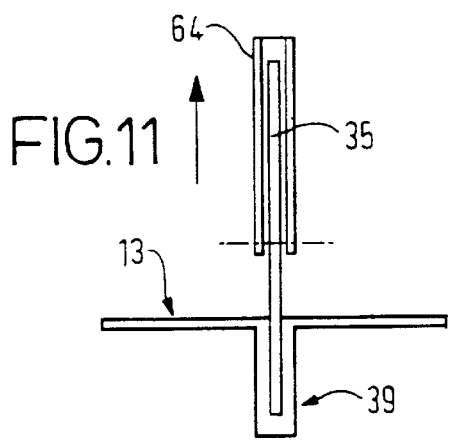
Figure 12:
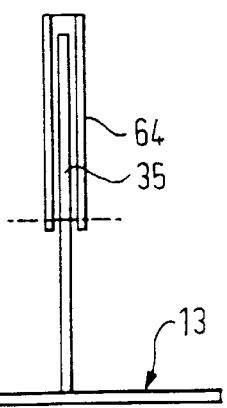

Reference is now made to FIGS. 8 to 12. FIG. 8 shows a typical shape formed by the roll forming machine of FIG. 1 and it will be noted that the T-shape has a web 39 of constant depth d, depth d being controlled by the wheel-like roller 35. The roll forming machine of the present invention can, if desired, be controlled to produce a formed laminate 13 having its web 39 tapered as indicated at 63 in FIG. 9. In FIG. 9, the taper 63 is formed by moving the wheel-like roller 35 upwardly (as viewed in FIG. 6) as the laminate 13 passes through the machine. FIG. 10 shows the wheel-like roller 35 on an adjustable mounting 64 and set to provide the maximum depth d. In order to form the taper 63, the mounting 64 gradually moves the wheel-like roller 35 towards the FIG. 11 position and the uncured or partially cured laminate 13 follows to create the taper. Continued movement of the wheel-like roller 35 towards the FIG. 12 position tapers the formed laminate further. Although it may not be possible to reshape the laminate 13 to the fully flat condition shown in FIG. 12, the depth of the formed laminate may be significantly reduced by the action of the wheel-like roller 35. As well as being capable of forming at taper 63 at one end of the formed laminate as shown in FIG. 9, the mounting 64 for the wheel-like roller 35 may be arranged to adjust the position of the wheel-like roller to provided areas of different depths throughout the length of the formed laminate 13. In FIGS. 10 to 12, the wheel-like roller 35 and the mounting 64 are illustrated diagrammatically. The position of the mounting 64 is controlled by a screw 65 and a servo motor 66. Operation of the servo motor 66 causes the screw 65 to raise or lower the mounting 64. The servo motor 66 may be controlled by suitable software 67 in response to the feed rate of the laminate 13 through the machine to maintain the desired taper 63. Conveniently, the feed rate of the laminate 13 can be sensed by sensing the feed rate of the selected rollers, where the latter are used to drive the laminate 13 through the machine 10 or by sensing the rate at which the pulling device 71 draws the laminate through the machine. The speed of the servo motor 66 is then controlled accordingly. Therefore, for a given rate of feed of the laminate 13 and for a desired angle of taper, the speed of the servo motor 66 is set by the software 67 accordingly.

Figure 13:
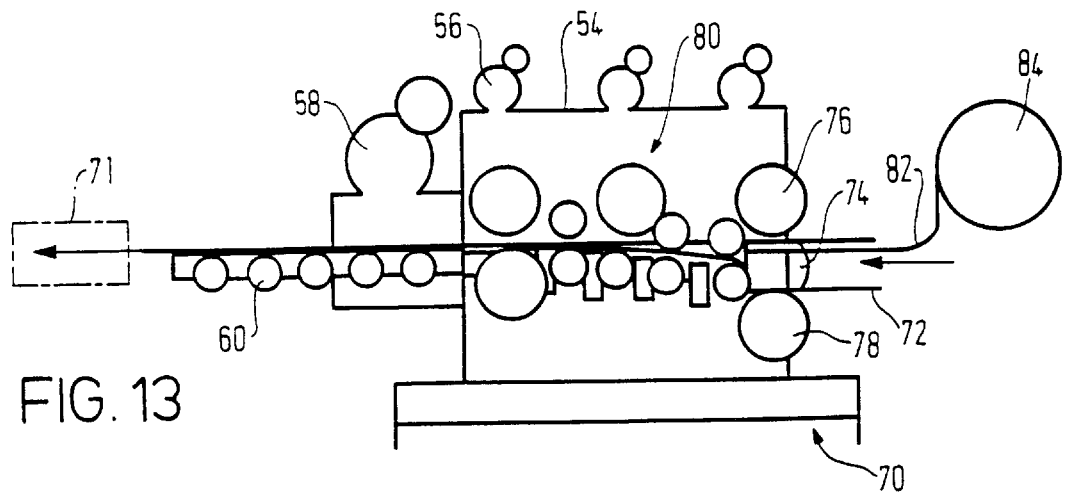
FIG. 13 is a diagrammatic cross section through a further embodiment of a roll forming machine in accordance with the invention.
Figure 14:
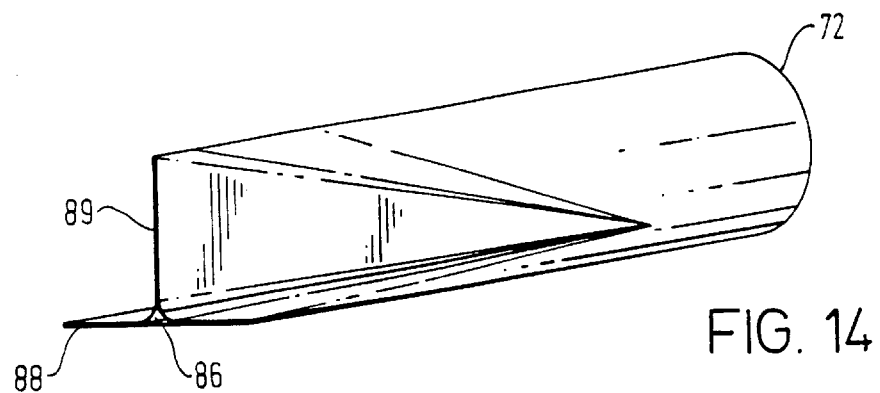
FIG. 14 is a diagrammatic perspective view of a tubular fabric in the form of a braid to be formed by the machine of FIG. 13.

Referring now to FIG. 13, a machine 70 is designed to shape a fabric 72 in the form of a tube, preferably a braided tube. The tube 72 passing over a floating mandrel 74 and between upper and lower rollers 76, 78. The tube 72 then passes through various sets of rollers generally indicated at 80 which gradually form the tube into a T-shape as shown in FIG. 14. In FIG. 14, the tube 72 is shown gradually changing from a circular cross-section at its right hand end as viewed in the drawings to the final T-shape cross section. Tows of material 82 are fed from a drum 84 through one end of the tube 72 and fill a triangular recess 86 formed between a horizontal flange 88 and a vertical web 89 of the T-shape. As before, air blowers 56 can be provided on a housing 54 of the machine and a blast freezer 58 may be provided for stiffening the tube 72 once it has been formed into the T-shape. Transport rollers 60 are provided as in FIG. 1 and the pulling device 71 for the tube 72 may also be provided. The tube 72 may be formed from carbon fiber which may be impregnated with suitable epoxy matrix. After leaving the machine, the T-shaped section is subjected to heat for curing purposes. Instead of drawing the laminate 13 or tube 72 through the machine 10 or 70, it may be held stationary and the machine may move relative thereto to effect the roll forming.

The T-shaped cross section as shown in FIGS. 6 and 7 ideally forms a blade stiffener for an aircraft aerofoil such as a wing. Such a blade stiffener may also benefit from the tapering described with reference to FIGS. 8 to 12.

Figure 15:
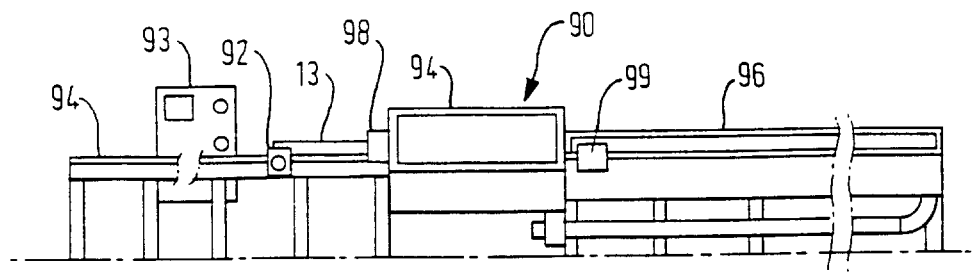
FIG. 15 is a diagrammatic side view of the layout of a further embodiment of the roll forming machine.

Referring to FIG. 15, a further roll forming machine 90 comprises a pulling device 92 operable by a controller 93. The pulling device 92 slides along a rail 94 and pulls the laminate 13 through a roller arrangement 94 similar to the arrangement of rollers 14, 20, 28, 36 of FIG. 1. A heated in-feed zone 96 and a chilled out-feed zone 98 correspond, respectively, to zones in FIG. 1 where the hot air blowers 56 and the blast freezer 58 of FIG. 1 are located. The software 67 for controlling the servo motor 66 shown in FIG. 10 is proprietary to the controller 93. A main control panel 99 for the roll forming machine 90 has a keyboard (not shown) for use by an operator for programming the software 67 and the machine can be turned 'on' and 'off' from the control panel.

The speed of the pulling device 92 and hence the speed at which the laminate 13 moves through the roll forming machine 90 is selected via the controller 93, for example a constant rate of feed of approximately 1.5 m/min (0.025 m/s). As in FIGS. 10 to 12, the speed of the servo motor 66 and hence the wheel-like roller 35 is controlled by the software 67. The keyboard of the control panel 99 facilitates the input of a desired angle or taper to be applied to the laminate 13 as it moves through the machine. In response to the input, the software 67 of the controller 93 is programmed and the software controls the operational speed of servo motor 66 in relation to the aforesaid given constant rate of movement of the laminate through the machine. The speed of the servo motor 66 determines the rate at which the wheel-like roller 35 moves relative to the laminate 13 to vary the angle of taper.

We claim:

1. A roll forming machine comprising:
   roller means for shaping a single length of fabric impregnated with a curable matrix to form a space between portions of said single length of fabric, said roller means arranged to move said portions towards each other during shaping, and
   feed means for feeding a length of material into said space.

2. A roll forming machine according to claim 1 in which the feed means causes the length of material to be laid into a recess formed at a juncture between adjacent portions of the deformed fabric and which defines the space.

3. A roll forming machine according to claim 2 in which the roller means deforms the fabric to position said juncture between flange and web portions of the fabric.

4. A roll forming machine according to claim 1 in which say a control means includes a roller for controlling depth of the formed fabric.

5. A roll forming machine according to claim 4 in which the control means for controlling depth is arranged to form sections of various depths in the length of the material.

6. A roll forming machine according to claim 1 in which the feed means feeds the length of material in the form of a tow of fibers.

7. A roll forming machine according to claim 1 in which heating means is provided for heating the fabric to soften the fabric prior to deformation.

8. A roll forming machine according to claim 7 which the heating means is arranged to heat the fabric as it encounters the roller means.

9. A roll forming machine according to claim 1 in which cooling means is provided for cooling the deformed fabric.

10. A roll forming machine according to claim 1 in which pulling means is provided for drawing the fabric to be deformed through the machine.

11. A roll forming machine according to claim 1 in which fixing means is provided for fixing the fabric in a given position and travel means is provided for moving the machine relative to the fabric to deform the fabric.

12. A roll forming machine according to claim 1 in which the roller means incorporates a release medium to minimise the risk of the fabric sticking to the roller means.

13. A roll forming machine according to claim 1 wherein said single length of fabric comprises a single lay-up of fabrics and the roller means comprises a means for shaping said lay-up of fabrics forming a laminate.

14. A roll forming machine according to claim 1 having a lay-up station for laying up fabrics to form a laminate and conveyor means for conveying the laminate from the lay-up station to the roller means.

15. A roll forming machine comprising:
    roller means for shaping a single length of fabric impregnated with a curable matrix to form a space between portions of said single length of fabric, each portion having a turned out edge, said roller means arranged to move said portions towards each other during shaping, and
    feed means for feeding a length of material onto a surface of the turned out edges of the shaped fabric so as to extend across the space created between portions of the fabric.

16. A roll forming machine according to claim 15 in which the roller means is arranged to form said space at a juncture between adjacent portions of the deformed fabric, said adjacent portions defining said surface.

17. A roll forming machine according to claim 16 in which the roller means deforms the fabric to position said juncture between flange and web portions of the fabric, wherein said flange portions comprise said surface.

18. A roll forming machine according to claim 15 in which a roller for controlling depth of the formed fabric is provided.

19. A roll forming machine according to claim 18 in which the control means for controlling depth is arranged to form sections of various depths in the length of the material.

20. A roll forming machine comprising:
    roller means for shaping a single length of fabric impregnated with a curable matrix to form a space between portions of said single length of fabric, said roller means arranged to move said portions towards each other during shaping, and
    feed means for feeding a length of material into said space,
    wherein the feed means causes the length of material to be laid into a recess formed at a juncture between adjacent portions of the deformed fabric and which defines the space, and the roller means deforms the fabric to position said juncture between flange and web portions of the fabric, in which the roller means deforms the fabric into a T-shaped section, the vertical limb of the T-shape forming the web and the horizontal limb thereof forming the flange.

21. A roll forming machine according to claim 20 in which the roller means deforms the fabric such that surfaces thereof are urged towards each other to form the web and surfaces are moved apart to form the flange.

22. A roll forming machine comprising:

roller means for shaping a single length of fabric impregnated with a curable matrix to form a space between portions of said single length of fabric, said roller means arranged to move said portions towards each other during shaping, and feed means for feeding a length of material into said space, wherein a control means includes a roller for controlling depth of the formed fabric, in which the control means for controlling depth of the formed fabric is controllable to vary the depth progressively to form a taper.

23. A roll forming machine comprising:

roller means for shaping a single length of fabric impregnated with a curable matrix to form a space between portions of said single length of fabric, and feed means for feeding a length of material into said space, wherein the fabric is in the form of a tube prior to shaping and the feed means is arranged to feed the length of material axially through the tube.

24. A roll forming machine comprising:

roller means for shaping a single length of fabric impregnated with a curable matrix to form a space between portions of said single length of fabric, said roller means arranged to move said portions towards each other during shaping, and feed means for feeding a length of material into said space, wherein the roller means are arranged to deform the fabric so as to form a T-shaped member for use as an aircraft aerofoil blade stiffener.

25. A roll forming machine comprising:

roller means for shaping a single length of fabric impregnated with a curable matrix to form a space between portions of said single length of fabric, said roller means arranged to move said portions towards each other during shaping, feed means for feeding a length of material onto a surface of the shaped fabric so as to extend across the space created between portions of the fabric, wherein the roller means is arranged to form said space at a juncture between adjacent portions of the deformed fabric, said adjacent portions defining said surface and wherein the roller means deforms the fabric to position said juncture between flange and web portions of the fabric, wherein said flange portions comprise said surface, wherein the roller means deforms the fabric into a T-shaped section, the vertical limb of the T-shape forming the web and the horizontal limb thereof forming the flange.

26. A roll forming machine according to claim 25 in which the roller means deforms the fabric such that surfaces thereof are urged towards each other to form the web and surfaces are moved apart to form the flange.

* * * * *